(12) United States Patent
Che et al.

(10) Patent No.: US 9,280,443 B2
(45) Date of Patent: Mar. 8, 2016

(54) DASHBOARD PERFORMANCE ANALYZER

(71) Applicant: Business Objects Software Ltd, Dublin (IE)

(72) Inventors: Jun Che, Shanghai (CN); Zimo Zhang, Shanghai (CN); Tianli Zhang, Shanghai (CN); Guan Li, Shanghai (CN)

(73) Assignee: Business Objects Software Ltd, Dublin (IE)

( * ) Notice: Subject to any disclaimer, the term of this patent is extended or adjusted under 35 U.S.C. 154(b) by 268 days.

(21) Appl. No.: 13/960,820

(22) Filed: Aug. 7, 2013

(65) Prior Publication Data
US 2015/0039942 A1    Feb. 5, 2015

(30) Foreign Application Priority Data

Jul. 30, 2013    (CN) .......................... 2013 1 0326002

(51) Int. Cl.
*G06F 11/00*    (2006.01)
*G06F 11/36*    (2006.01)
*G06F 11/34*    (2006.01)

(52) U.S. Cl.
CPC ........ *G06F 11/3612* (2013.01); *G06F 11/3409* (2013.01); *G06F 11/3466* (2013.01)

(58) Field of Classification Search
CPC ........................ G06F 11/3409; G06F 11/3466
USPC ........................................................ 714/47.2
See application file for complete search history.

(56) References Cited

U.S. PATENT DOCUMENTS

| | | | |
|---|---|---|---|
| 8,065,618 B2 | 11/2011 | Kumar et al. | |
| 8,352,867 B2 | 1/2013 | Itani | |
| 8,417,556 B2 | 4/2013 | Moukas et al. | |
| 8,990,778 B1* | 3/2015 | Allocca et al. | 717/126 |
| 9,043,535 B1* | 5/2015 | Derbeko et al. | 711/103 |
| 2006/0153090 A1* | 7/2006 | Bishop et al. | 370/252 |
| 2008/0187033 A1* | 8/2008 | Smith | 375/228 |
| 2009/0276771 A1* | 11/2009 | Nickolov et al. | 717/177 |
| 2010/0003923 A1* | 1/2010 | McKerlich et al. | 455/67.11 |
| 2010/0023531 A1 | 1/2010 | Brisebois et al. | |
| 2010/0042445 A1 | 2/2010 | Nicosia | |
| 2010/0053167 A1* | 3/2010 | Shinohara et al. | 345/440 |
| 2010/0138295 A1 | 6/2010 | Caron et al. | |
| 2010/0198649 A1 | 8/2010 | Appleyard et al. | |
| 2010/0211895 A1* | 8/2010 | Mistry et al. | 715/764 |
| 2010/0332271 A1* | 12/2010 | De Spong | 705/7 |
| 2011/0044291 A1* | 2/2011 | Omar | 370/332 |
| 2011/0078171 A1* | 3/2011 | Wagenblatt et al. | 707/769 |
| 2012/0041990 A1 | 2/2012 | Kreindlina et al. | |
| 2012/0054334 A1 | 3/2012 | Befort | |
| 2012/0089902 A1* | 4/2012 | Sheflin | 715/234 |
| 2012/0123989 A1 | 5/2012 | Yu et al. | |
| 2012/0159359 A1 | 6/2012 | Ehrler et al. | |
| 2012/0180029 A1 | 7/2012 | Hill et al. | |
| 2012/0226626 A1* | 9/2012 | Venkateswaran et al. | 705/342 |
| 2012/0278365 A1* | 11/2012 | Labat et al. | 707/798 |
| 2012/0296624 A1* | 11/2012 | Jeng et al. | 703/22 |
| 2013/0024760 A1 | 1/2013 | Vogel et al. | |
| 2013/0061169 A1 | 3/2013 | Pearcy et al. | |

(Continued)

*Primary Examiner* — Chae Ko
(74) *Attorney, Agent, or Firm* — Horizon IP Pte. Ltd.

(57) ABSTRACT

Described herein is a technology for a dashboard used for visualizing data. In some implementations, a dashboard with one or more dashboard item is provided. Performance of the dashboard is evaluated to determine a load time of the dashboard. Possible suggestions for improving performance of the dashboard are provided if performance issues are determined from evaluating performance of the dashboard.

20 Claims, 14 Drawing Sheets

(56) References Cited

U.S. PATENT DOCUMENTS

| | | | |
|---|---|---|---|
| 2013/0238384 A1* | 9/2013 | Caesar et al. | 705/7.27 |
| 2013/0297588 A1* | 11/2013 | Tyagi | 707/722 |
| 2014/0032762 A1* | 1/2014 | Harvey et al. | 709/226 |
| 2014/0067407 A1* | 3/2014 | Sathe et al. | 705/2 |
| 2014/0095505 A1* | 4/2014 | Blanchflower et al. | 707/737 |
| 2014/0108985 A1* | 4/2014 | Scott et al. | 715/771 |
| 2014/0337778 A1* | 11/2014 | Armitage | 715/771 |

* cited by examiner

DASHBOARD PERFORMANCE ANALYZER

TECHNICAL FIELD

The present disclosure relates generally to intelligent tools. In particular, an intelligent tool includes a performance analyzer for a dashboard used for visualizing data.

BACKGROUND

Dashboard design tools are business intelligence tools which are used to create dashboards for visualizing data based on defined metrics and key performance indicators (KPIs). An important aspect of a good dashboard design is its performance or load time. For example, a dashboard with a long load time (e.g., low performance) may impact the effectiveness of a dashboard due to frustration of the user waiting for the dashboard to run. Dashboards may be run on a plethora of devices. For example, the dashboard may be run on mobile devices, such as tablets, smart mobile phones, or non-mobile devices, such as laptop or desktop computers. Different types of devices have different processing power. Generally, mobile devices have lower processing speeds compared to non-mobile devices. As such, a dashboard may perform well for devices with high processing speeds but bad performance for devices with low processing speeds.

It is therefore desirable to provide tools which can determine the performance of a dashboard design on a device basis.

SUMMARY

A method of evaluating a dashboard design is described herein. A dashboard with one or more dashboard items is provided. Performance of the dashboard is evaluated to determine a load time of the dashboard. Possible suggestions for improving performance of the dashboard are provided if performance issues are determined from evaluating performance of the dashboard.

In one embodiment, a dashboard evaluation system is disclosed. The system includes a dashboard parser and a performance evaluator. The dashboard parser identifies items of the dashboard while the performance evaluator determines a load time of the dashboard. The system also includes a recommender. The recommender suggests solutions to improve performance of the dashboard.

In another embodiment, a computer usable medium having a computer readable program code tangibly embodied therein which is adapted to be executed by a processor to implement a method for evaluating a dashboard design is presented. The method includes providing a dashboard. Performance of the dashboard is evaluated to determine a load time of the dashboard. Possible suggestions for improving performance of the dashboard are provided if performance issues are determined from evaluating performance of the dashboard.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework or application for displaying data is described herein. The display framework may be used, for example, to display business information to enhance the decision making process. In one implementation, the present framework can evaluate the effectiveness of dashboards used to visualize data. The framework may provide guidance to, for example, dashboard designers to improve the workflow related to designing dashboards.

Figure 1:
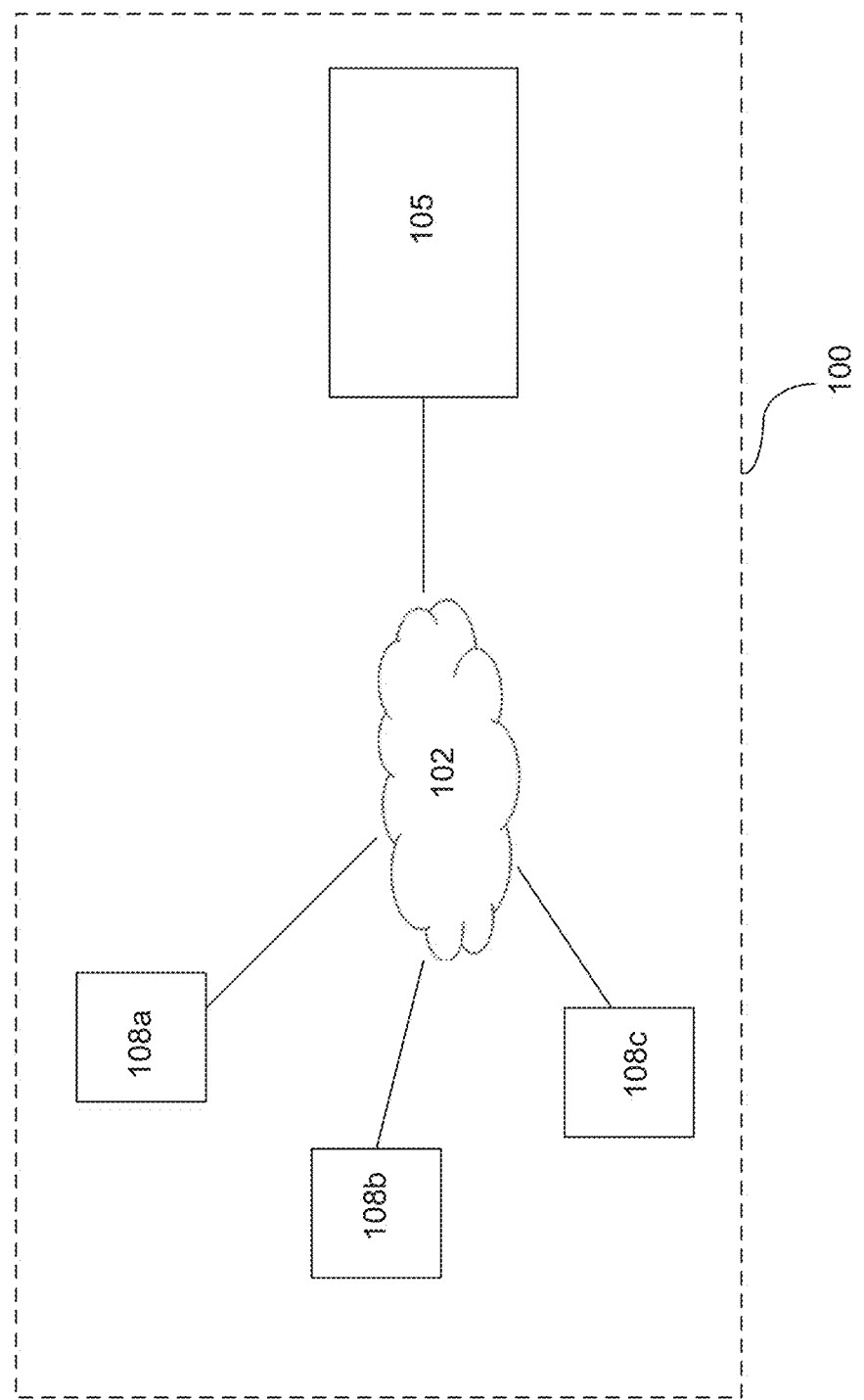
FIG. 1 shows an embodiment of an environment.

FIG. 1 shows a block diagram of an exemplary environment 100. The environment, for example, facilitates visualizing data. The environment may have a client/server architecture. For example, the environment may be a distributed client/server architecture. In one embodiment, the environment includes one or more clients 108a-c and a server 105 communicatively coupled via a communication network 102. Clients 108a-c may access the server 105 to store information and/or retrieve information maintained on the server. Furthermore, the server may facilitate communication between clients.

The communication network, for example, may be a local area network (LAN) which interconnects different devices, such as the clients and server. Other types of networks may also be useful. The devices may be coupled via the network by wireless and/or wired connections.

The server, in one embodiment, may be a computer which includes a memory and a processor. The server is configured to transmit, receive, process and store information or data associated with the environment. Various types of computers may be employed. For example, the computer may be a mainframe, workstation, as well as other types of processing devices. The server may be adapted to execute any operating system. For example, the operating system of the server may be z/OS, Linux-Intel, Linux/390, UNIX, or Windows Server. Other types of operating systems may also be used. The server may also include or be communicatively coupled with a web server and/or a Simple Mail Transfer Protocol (SMTP) server.

Although the environment is illustrated with one server, it is understood that more than one server, such as a server pool, as well as computers other than servers, may be employed.

The memory of the server may include any memory or database module. The memory may be volatile or non-volatile types of memories, such as magnetic media, optical media, random access memory (RAM), read-only memory (ROM), removable media, or any other suitable local or remote memory component.

A client may be a local or remote computing device with, for example, local memory and a processor. The memory may include fixed and/or removable storage media such as a magnetic computer disk, CD-ROM, or other suitable media. Various types of processing devices may serve as a client. For example, the client may be a PC, tablet PC, workstation, network computer, kiosk or personal data assistant (PDA). Other types of processing devices may also be used. The processing devices may include a memory and a processor. Input and output devices may be provided for the processing device. The input device may be, for example, a keypad, touch screen, mouse, or other device that can accept information from a user. For example, a client may receive requests from a user using the input device. The output device may be a display to convey information to a user. Other types of input and output devices may also be useful. The clients can receive, transmit, process and store any appropriate data associated with the environment 100.

Client/server (C/S) applications may be provided in the environment. Generally, C/S applications include front end and back end portions. The front end portions are stored locally on the clients while the back end portions are located in the server. Various types of C/S applications may be provided in the environment.

A client may include a user interface for a user to interface with the environment for various purposes. For example, the interface may be used to access various applications in the environment. The user interface may also serve other purposes. In one embodiment, the user interface includes a graphical user interface (GUI). A GUI may provide an efficient and user-friendly manner of presenting information or communicating with the environment. For example, a GUI may include a task menu as well as one or more panes for displaying information. Other types of user interfaces, such as command line interface (CLI), may also be useful. The type of user interface may depend on the type of application running on the client. For example, the front end portion may include a GUI to enable a user to interact with the back end portion to access data stored in the server.

Although the environment is shown with three clients and one server, it is understood that there may be any number of clients communicatively coupled to one or more servers. Additionally, other types of devices may be included. The clients may be local or external clients. Furthermore, "client" and "user" may be used interchangeably as appropriate without departing from the scope of this disclosure. For example, a client may be used by one or more users while a user may use one or more clients. As an illustration, a user may have a user account for an application, such as the email system. Any user may access the user's respective account from any client by performing an authentication or a login process, such as providing a user name and password.

Figure 2:
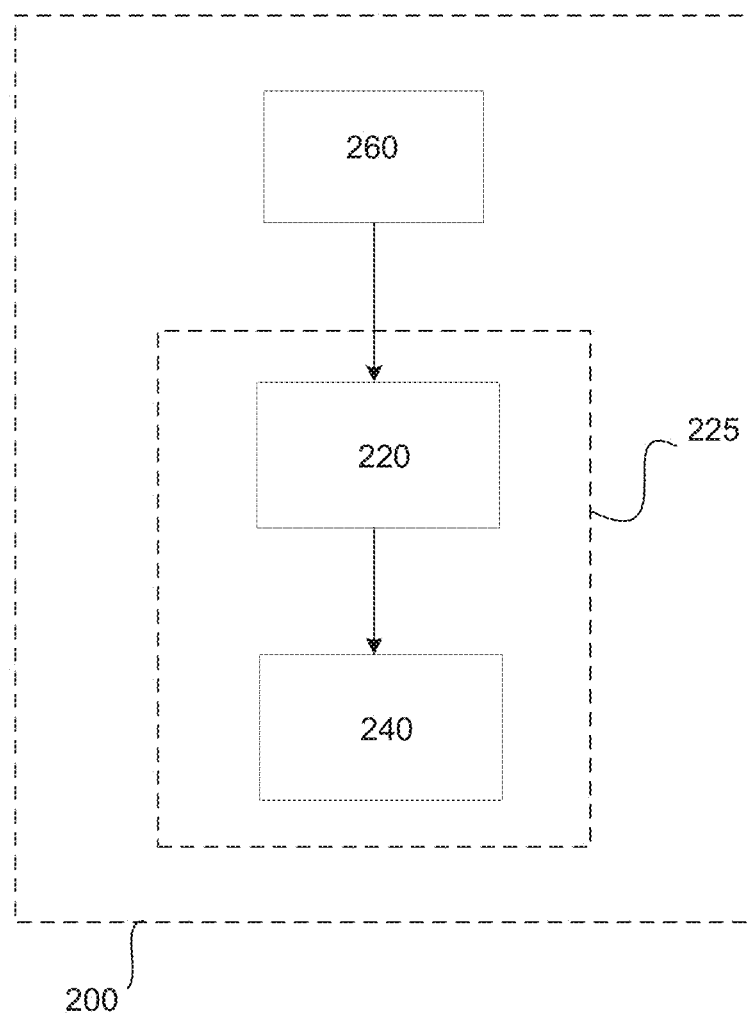
FIG. 2 shows an embodiment of a software environment.

FIG. 2 shows an embodiment of a software environment 200. As shown, the software environment may include a data source 260. The data source, for example, may be data files. Any type of data may be contained in the data files. The data files, for example, may be reports, spreadsheets, XML files, flat files, web service files or other types of files. The data files may be generated from one or more software applications, such as a database or other types of software applications. For example, data may be personal data or business data, such as data of a company. Business data can include employee data, sales data, as well as other types of data related to a company. The software application may include various types of functions, such as report generation and functions related to data analytics. The software application may include a C/S architecture. For example, data, reports and other information may be stored in a server. In other embodiments, the software application may be locally installed in a client or a standalone computer. In such cases, the data, reports and other information are locally stored.

In one embodiment, the software application includes a business application. Various types of business applications may be used. The business application, for example, maintains data of a business and creates business reports relating to the data. Such business applications may include, for example, SAP Crystal Solutions, including Xcelsius, Crystal Reports, Web Intelligence from SAP AG. Other types of business applications or suites of business applications may also be useful.

A dashboard design application 220 is provided in the software environment. The dashboard design application is used to design or create dashboards. A dashboard may include different elements to present aggregated views of data using, for example, appropriate KPIs, metrics, trends, data visualizations and interactions.

For example, at the highest level, a dashboard includes a user interface (UI) or dashboard panel. Within the panel there may be one or more viewing zones which correspond to the second highest level. A viewing zone includes one or more visual components to facilitate data visualization. Providing other types of components or elements may also be useful. Depending on the design, a viewing region may include sub-viewing regions having different visual components. The dashboard may also be provided with different features or functions. For example, components or elements, such as drop down menus, sliders and command buttons for performing "what if" analysis and dynamic visualization of data may be provided to enable interactions by a user at runtime. It is believed that the use of dashboards enables quick understanding of the data to facilitate better and more efficient decision making.

In one embodiment, the dashboard design application is SAP® BusinessObjects™ Xcelsius® Enterprise. Other types of dashboard design applications may also be useful. For example, the dashboard design application may be SAP® Visual Composer.

Figure 3A:
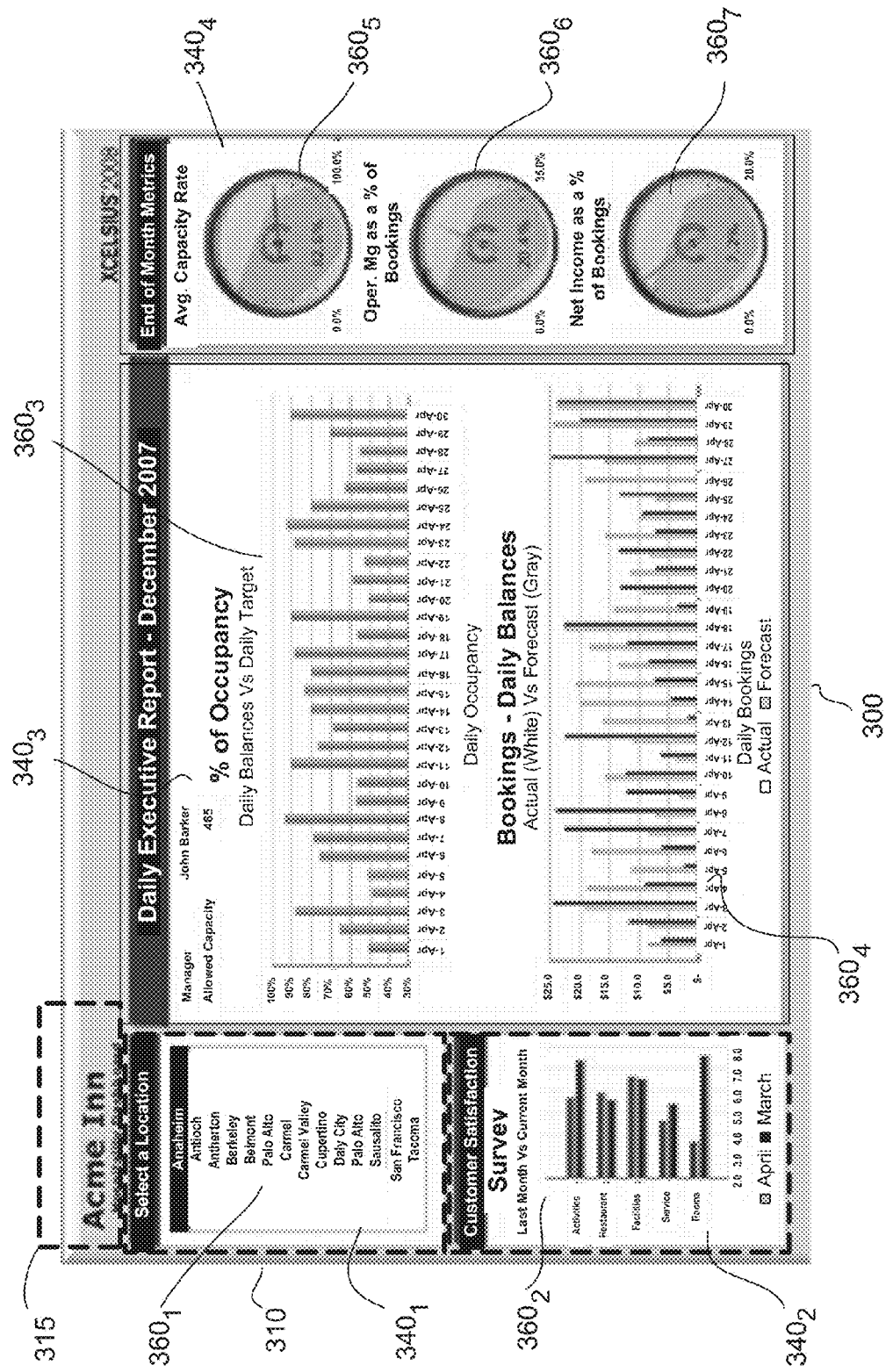
FIGS. 3a-b show exemplary embodiments of dashboards.

FIG. 3a shows an exemplary embodiment of a dashboard 300. As shown, the dashboard includes a dashboard UI or panel 310. The panel is a top level of the dashboard. A dashboard label 315 is provided to describe the dashboard. The dashboard label may be disposed at about an edge of the dashboard. For example, the dashboard label is disposed in an upper left corner of the dashboard. Disposing the dashboard label at other locations may also be useful.

Within the panel there may be one or more viewing zones 340. A viewing zone may also be provided with a viewing zone label. A viewing zone includes one or more visual components 360 or other types of components. Components, for example, include different types of charts, graphs, gauges, selectors, filters, maps and skins. The different components are used to visualize data or segments of data, such as by filtering.

Illustratively, the dashboard provides views of data for a chain of inns. In this context, KPIs, trends and important information, for example, relate to occupancy, customer satisfaction and revenues. The dashboard includes four viewing zones $340_{1-4}$. Providing the dashboard with other number of viewing zones may also be useful. The first viewing zone $340_1$ includes a filter component for displaying information from a region, such as a city. Providing other types of filters, such as time, may also be useful.

The second zone $340_2$ displays a chart component $360_2$. As shown, the chart component includes an analytic grid or bar chart displaying information related to customer satisfaction. The third zone $340_3$ includes first and second chart components $360_{3-4}$. The chart components comprise analytic grids or bar charts which represent occupancy information and booking (e.g., dollar amount) information. The fourth zone $340_4$ includes first, second and third gauge components $360_{5-7}$. The gauge components show average capacity rate and operating mg as a percentage of booking and net income as a percentage of booking. Other types of information or analytics may be displayed by the dashboard, depending on the application.

As described, the dashboard contains a single page. Providing dashboards having multiple pages may also be useful.

Figure 3B:
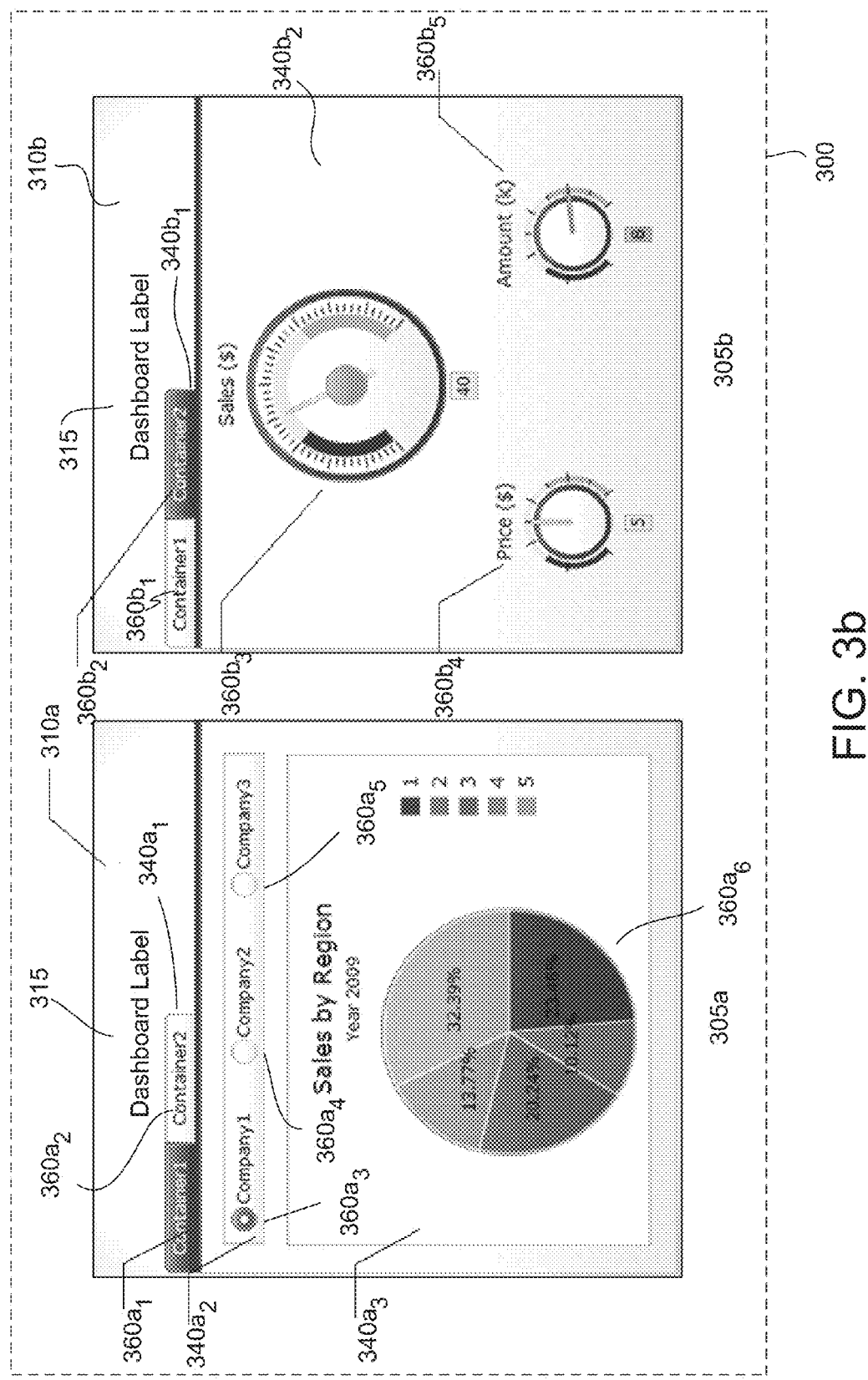

FIG. 3b shows another exemplary embodiment of a dashboard 300. As shown, the dashboard contains first and second pages 305a-b with dashboard label 315. The panel 310a is the top level of the first page. The first page includes first, second and third viewing regions $340a_{1-3}$. The first viewing region contains first and second selector components $360a_{1-2}$. The selector components, for example, include tab components for selecting the page of the dashboard for viewing. The second viewing region includes first, second and third filtering components $360a_{3-5}$. The filtering components, for example, are radio button components for selecting the desired subset of data to view. For example, the radio button components enable a user to view data of a desired company from a group of companies. The third viewing region includes a chart component $360a_6$. The chart component includes a pie chart. Illustratively, the pie chart represents sales data by region.

As for the second page, it includes first and second viewing regions $340b_{1-2}$. The first viewing region, similar to that of the first page, contains first and second selector components $360b_{1-2}$. The selector components, for example, comprise tab components for selecting the desired page of the dashboard for viewing. The second viewing region includes a first gauge component $360b_3$ and first and second dial components $360b_{4-5}$. The gauge component shows sales while the dial components show price and amount.

A gauge or a dial component may be used to show, for example, a KPI vs. its target. The KPI value may be shown by a needle while the target may be represented by a color range. As shown, the color range includes 3 colors. The colors may be, from left to right, red, yellow and blue. The colors may be used to indicate the relative position of a particular KPI with respect to its target. For example, red indicates that the KPI is below target, yellow indicates that the KPI is close to target while blue indicates that the KPI is at or above target.

Using the selector and filtering components, a user may switch between pages of the dashboard as well as sales data and performance of the different companies.

Referring back to FIG. 2, the software environment includes a dashboard performance analysis system (PAS) 240. The PAS, for example, may be integrated into the dashboard design application, as indicated by a dashed line 225. In other embodiments, the PAS may be a separate application which interacts with the dashboard design application. Other configurations of dashboard design applications and dashboard evaluators may also be useful.

The PAS analyzes a dashboard to determine its performance. In one embodiment, the performance analysis by PAS determines the load time of a dashboard. In another embodiment, the PAS includes a suggestion function. The PAS, for example, provides suggestions to improve performance if performance issues are determined during the performance analysis. The PAS provides a rating of the dashboard, thereby indicating its performance.

The software environment may include additional applications which interact with the data source and dashboard design and evaluation applications. For example, the applications may be used to generate reports and perform data analytics. Other types of tools or applications, such as Microsoft Office, Adobe and/or a web portal, may also be provided in the software environment.

Figure 4:
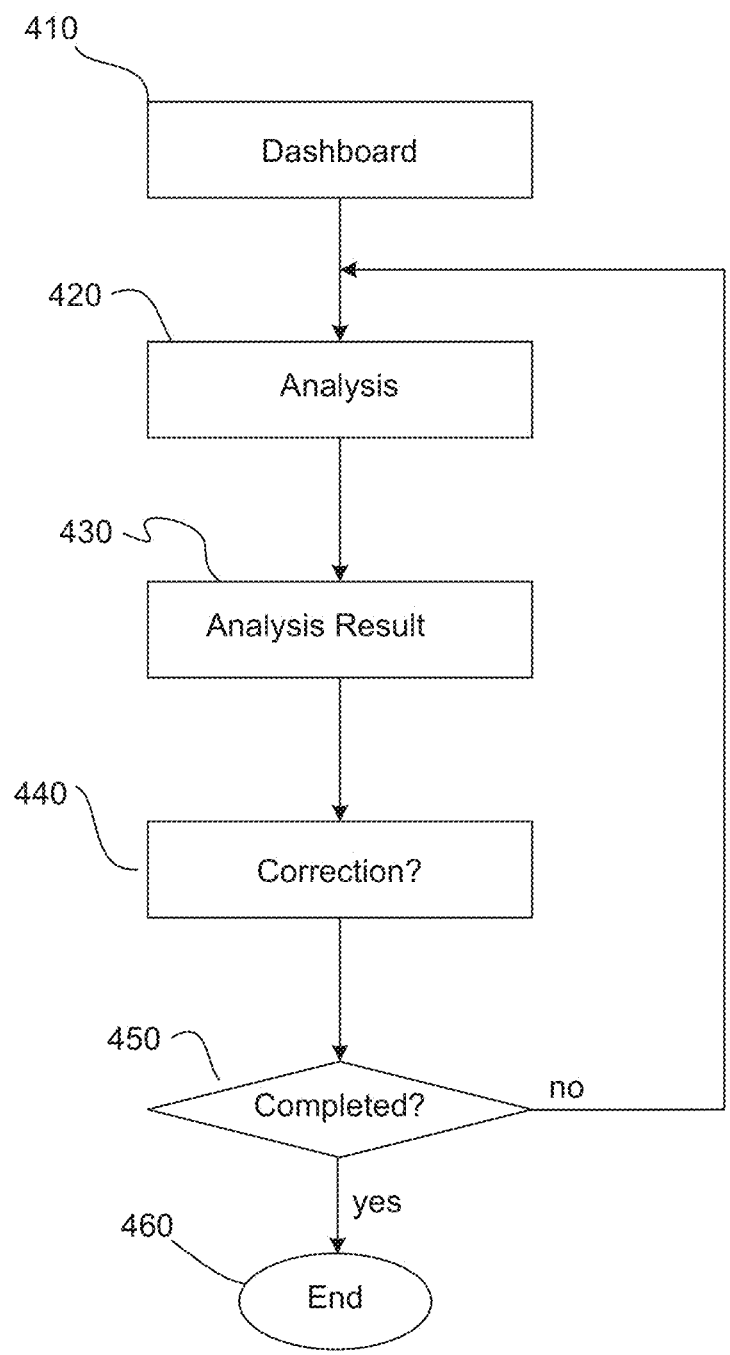
FIG. 4 shows an embodiment of a process for analyzing the performance of a dashboard.

FIG. 4 shows an embodiment of a process 400 for analyzing the performance of a dashboard. At step 410, a dashboard model is provided to, for example, the PAS. The dashboard model, is a data representation of the graphical dashboard. The dashboard model may be, for example, a newly designed dashboard by a user or a dashboard designer. In other embodiments, the dashboard model may already exist in the software environment.

At step 420, the PAS is initiated to perform a performance analysis on the dashboard model. The PAS determines, for example, the load time of the dashboard model 410. The performance analysis may be based on a specific device. For example, a user may select a device, such as an iPad, an iPhone 5, or Nexus 7. Other types of devices may also be analyzed, including mobile and non-mobile devices. The selection may be provided in a selection table. In some cases, where a device is not listed in the selection table, a user may use a device which is in the selection table as a reference device. Basing the performance analysis on other parameters, such as operating systems and/or processor type may also be useful. The load time may be determined based on the composition of the dashboard and historical data. In one embodiment, the average load time of the dashboard is determined. Determining other information related to the dashboard performance may also be useful A performance analysis result is generated at step 430. For example, the analysis result may be a report indicating the performance of the dashboard. In one embodiment, the analysis result provides a breakdown of load times for the different dashboard components. The load time may depend on the type of component and amount of data. For example, the load time depends on the complexity of the dashboard component and amount of associated data. For sake of comparison, dashboard containing the same number of simple components load much faster compared to those with the same number of complex components.

Based on the analysis result, the dashboard designer may make changes at step 440 to increase performance of the dashboard. For example, the dashboard designer may make changes to the dashboard to decrease the load time of the dashboard. The dashboard with changes may be re-evaluated at step 420. The process may be repeated until a desired level of performance is achieved. In some cases, the PAS may provide suggestion as to how to improve the performance of the dashboard. When no changes are made or if the user is satisfied with the performance results, the analysis is completed at step 450 and the PAS is terminated at step 460.

In some embodiment, the PAS analyzes the dashboard model as it is being designed by a user with a dashboard designer. For example, the PAS may be part of a dashboard designer and is automatically initiated when the dashboard designer is invoked by a user to design a dashboard. The parameters of the analysis may be selected when the dashboard designer is invoked. A dashboard may be analyzed as it is designed by the user. For example, as each dashboard item is incorporated into a dashboard, the PAS analyzes it to evaluate its performance. In some cases, an existing dashboard may be updated. In such cases, the performance may be updated as new dashboard items are added. Providing the PAS as a separate module from the dashboard designer may also be useful. The PAS may be invoked, as desired by the user to analyze a dashboard model, whether completed or not. Other configurations of the PAS may also be useful.

Figure 5:
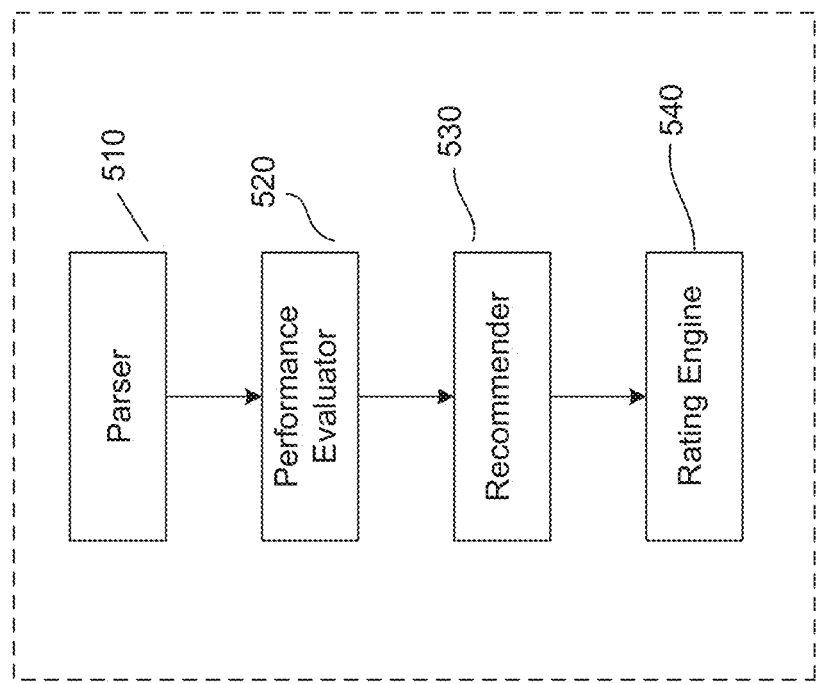
FIG. 5 shows a high level architecture of an embodiment of a PAS.

FIG. 5 shows a high level architecture of an embodiment 500 of a PAS 240. The PAS includes various modules or components for performing different functions associated with performing performance analysis on a dashboard. In one embodiment, the PAS includes a dashboard parser 510, a performance evaluator 520, a recommender 530 and a rating engine 540.

The PAS receives, as an input, a dashboard model. The dashboard model may be a newly designed dashboard. For example, the dashboard model may be from a dashboard designer. A dashboard includes various elements or items. The items may be generally categorized as components and formulas. In one embodiment, a component may be categorized as a complex or a simple component while a formula may be categorized as a range or a simple formula. A complex component is a component which draws lots of data points on the UI. A simple component is a component whose performance is a constant value. A range formula is a formula which calculates data in any array and its performance depends on the size of the array. A simple formula is a formula whose performance is constant. A variable which impacts the performance of a complex component item is its data amount. Similarly, a variable which impacts the performance of a range formula is its data amount. Variables which impact the overall performance of the dashboard are the amount of components and formulas. Other configurations for categorizing the various items of a dashboard may also be useful. For example, the categories may have a finer or a coarser granularity or other types of categories.

Table 1 below shows an exemplary list of categories for various elements of a dashboard:

TABLE 1

| Item category | Variables | Description | Sample Items or type |
|---|---|---|---|
| Complex Component | Component amount Data amount | Draw data points on UI | Chart Scorecard Table List View |
| Simple Component | Component amount | Performance is a constant value | Combo box Label Text Input Slider Button |
| Range Formula | Formula amount Data amount | Calculates all data in an array | LOOKUP SUM COUNT MATCH INDEX |
| Simple Formula | Formula amount | Performance is a constant value. | + - * / = |

TABLE 1-continued

| Item category | Variables | Description | Sample Items or type |
|---|---|---|---|
| | | | DATA TIME TRUE FALSE IF NOT OR |

Categorizing the different components may be facilitated by, for example, a category look up table. The category look up table may be stored in memory, such as a knowledge base module (not shown). Storing the category look up table in other modules may also be useful.

The different items of a dashboard model, for example, are stored as XML nodes. The dashboard parser loops through the dashboard model and extracts or parses out the different items and its associated variables. The information of the dashboard model is converted into a row-column table.

Table 2 below shows an exemplary output of the parser:

TABLE 2

| Item Name | Item Category | Variable Type | Variable Value |
|---|---|---|---|
| Pie Chart 1 | Complex Component | Data amount | 6 |
| Pie Chart 2 | Complex Component | Data amount | 4 |
| Scorecard 1 | Complex Component | Data amount | 30 |
| LookUp (A1:D50) | Range Formula | Data amount | 200 |
| LookUp (F1:F3000) | Range Formula | Data amount | 3000 |
| IF | Simple Formula | Formula amount | 5 |

The output of the parser is passed to the performance evaluator. The performance evaluator analyzes the parsed dashboard model to determine its performance. In one embodiment, the performance evaluator evaluates the various items of the dashboard to determine its performance. For example, the evaluator determines the load times of the items. The overall performance of the dashboard is the total load time of the items of the dashboard.

In one embodiment, the evaluator determines the dashboard performance by calculating the average load times of the items as well as the average load time of the dashboard. When determining an average load time, its standard deviation is calculated as well. As such the average load time of an item is the average load time±the standard deviation. For the average load time of a dashboard, it is the total of the average load times of the elements±the total standard deviation.

In one embodiment, simple components and simple formulas have constant load time values. As for complex components and range formulas, their load times include first and second parts. The first component is a constant part which is evaluated without data and the second part is a variable or linear increasing part. The variable part is related to the amount of data associated with the item. In one embodiment, the variable part is linearly related to the amount of associated data. For example, the variable part increases linearly with increasing amount of data. The load time for a complex component or range formula is equal to the sum of the constant and variable parts.

Performance benchmark data may be provided to facilitate the performance evaluation of the dashboard. The performance benchmark data includes load times of different types of items. For example, the benchmark data includes load times of different types of items for different types of devices. The benchmark data may be grouped into device types. For example, a table may include a listing of load times of different dashboard items for a specific device. Different tables are provided for different types of devices. The tables, for example, may be stored in a knowledge base. Storing the tables in other locations may also be useful.

In one embodiment, performance benchmark data includes two types of load times. The first type relates to constant load times. For example, constant load times are for simple components, simple formulas, and constant parts of complex components and range formulas. The load times for constant parts of complex components and range formulas, in one embodiment, are load times without any data points. The second type relates to variable load times. For example, variable load times are for linear increasing parts of complex components and range formulas. The load times for linear increasing parts, in one embodiment, are load times for a single data point.

The benchmark data, in one embodiment, are obtained by actual testing. For example, the various dashboard items are tested to obtain their load times. In one embodiment, an item may be tested multiple times to obtain its average load time. For example, the mean µ, such as arithmetic mean or population mean, may be obtained from the measured load times of a dashboard item. The standard deviation σ, for example, biased or uncorrected, may be calculated from the measured load times.

In one embodiment, simple components and simple formulas are tested to obtain their µ and σ. For example, all different simple components and simple formulas are tested to obtain their µ and σ. The load times of simple components and simple formulas are constant values. In the case of complex components and range formulas, their µ and σ are obtained with and without data. For µ and σ with data, they are measured with 1 data point. For example, µ and σ are obtained for all complex components and range formulas without data and with 1 data point. Obtaining other types of performance benchmark data may also be useful.

Table 3 below shows some exemplary benchmark performance data for use in a performance evaluation:

TABLE 3

| Item | Item Category | Average time | Standard Deviation |
|---|---|---|---|
| Pie Chart (without data) | Complex Component | $\mu_{piechartbase}$ | $\sigma_{piechartbase}$ |
| Pie Chart (with 1 data point) | Complex Component | $\mu_{piechartdata}$ | $\sigma_{piechartdata}$ |
| Label | Simple Component | $\mu_{label}$ | $\sigma_{label}$ |
| LookUp (A1:D50) | Range Formula | $\mu_{blookupdata}$ | $\sigma_{lookupdata}$ |

The performance benchmark data are obtained for different types of devices. For example, performance benchmark data are obtained from different types of mobile devices. The performance benchmark data may be obtained from currently available mobile devices, such as smart phones, tablet devices or other types of mobile devices. Obtaining performance benchmark data on other types of devices, including based on processors and/or operation systems, may also be useful. The performance benchmark data may be updated as new or untested devices or dashboard elements become or are available. Other techniques for obtaining performance benchmark data may also be useful. For example, simulators, such as those based on models of different types of devices, may be employed. The performance benchmark data may be contained in the performance evaluator. Storing the performance benchmark data in other locations may also be useful. For example, the performance benchmark data may be contained in a knowledge base.

In one embodiment, the mean or average load time, for example, arithmetic or population mean, of a formula or a component is calculated as follows:

$$\mu = \frac{1}{N} \sum_{i=1}^{N} t_i \quad \text{(formula 1)}$$

where,
N is the number of measured load times for a component/formula,
i is a natural number from 1 to N, and
$t_i$ is the $i^{th}$ performance test data or measured load time on a device of a component/formula.

In the case of a complex component or range formula, the test load times are taken with one data point.

Once the mean load time of an item is obtained, the standard deviations a may be calculated as follows:

$$\sigma = \sqrt{\frac{1}{N} \sum_{i=1}^{N} (t_i - \mu)^2} \quad \text{(formula 2)}$$

where,
N is the number of measured load times for a component/formula,
i is a natural number from 1 to N,
$t_i$ is the $i^{th}$ performance test time of a component/formula, and
µ is the mean load time according to formula 1.

Based on the output of the dashboard parser and performance benchmark data, the performance evaluator calculates the performance of the dashboard. In one embodiment, the performance evaluator calculates the average load times of the different elements of the dashboard. For example, the performance evaluator calculates the average load times of the different elements of the dashboard listed in the output of the dashboard parser, such as simple components, complex components, simple formulas and range formulas. The overall performance of the dashboard is the sum of the mean load times of all elements of the dashboard. The mean load times for the dashboard items are calculated one at a time. For example, the mean load times of the items may be calculated in the order listed by the output of the dashboard parser. Other techniques for calculating the mean load times may also be useful.

In one embodiment, average load times and standard deviations of simple components and simple formulas of the dashboard can be obtained directly from the appropriate performance benchmark table. For example, the average load times of simple components or simple formulas are obtained from the performance benchmark table corresponding to the device of interest. The device of interest may be selected by the user when the performance analysis is performed. This is because average load times for simple components and simple formulas are constant. As such, the average load times are already provided in the tables.

As for the mean or average load time of a complex component or a range formula cplxµ(m), it is calculated as follows:

$$cplx\mu(m) = \mu_{base} + (\mu_{data} - \mu_{base}) * m \qquad \text{(formula 3)}$$

where, $\mu_{data}$ is the mean load time of a complex component/range formula with 1 data point as obtained from the tables according to formula 1, $\mu_{base}$ is the mean load time of a complex component/range formula without data as obtained from the tables according to formula 1, and m is the quantity of data points binding to this complex component/range formula as provided by the output of the dashboard parser.

Once the mean or average load time of a complex component or range formula is obtained, its standard deviation a may be calculated as follow:

$$cplx\sigma(m) = \sqrt{\sigma_{data}^2 * m + \sigma_{base}^2} \qquad \text{(formula 4)}$$

where, m is the quantity of data points binding to the complex component/range formula, $\sigma_{data}$ is the standard deviation of the mean load time with 1 data point from the tables according to formula 2, and $\sigma_{base}$ is the standard deviation of the average time for the complex component/range formula without data from the tables according to formula 2.

The mean or average load times of the elements of the dashboard of interest can be obtained. For example, the mean load time for each element can be obtained. The total mean load time of the dashboard is the sum of the mean load times of the dashboard elements.

In one embodiment, regarding simple formulas and simple components, the mean or average load times of the different types of simple formulas and simple components of the dashboard under analysis are obtained. For example, if the dashboard has 4 simple components of the same type, the average load time of one is obtained. The average load time is then multiplied by the quantity or number of components of the same type. In the case where there are 4 simple components of the same type, the average load time is multiplied by 4 to obtain the total average load time of the 4 simple components. The total average load times of simple components and simple formulas $F_s$ of the dashboard may be calculated as follows:

$$F_s(p) = \Sigma_{i=1}^{p}(\mu_i * N_i) \qquad \text{(formula 5)}$$

where, p is the quantity of the different types of simple components/formulas, i is a natural number from 1 to p, $\mu_i$ is the mean or average time of the $i^{th}$ specific type of simple component/formula from the tables according to formula 1, and $N_i$ is the quantity of the $i^{th}$ specific type of simple component/simple formula based on the output of the dashboard parser.

As for the total mean or average load times of the complex components and range formulas, it can be calculated as follows:

$$F_c(q) = \Sigma_{i=1}^{q} cplx\mu_i(m_i) \qquad \text{(formula 6)}$$

where, q is the quantity of complex components/range formulas, i is a natural number from 1 to q, $m_i$ is the quantity of data points binding to the $i^{th}$ complex component/range formula, and $cplx\mu_i(m_i)$ is the mean or average load time of the $i^{th}$ complex component/range formula according to formula 3.

The total average load time $F_{dashboard}$ of the dashboard under analysis can be calculated as follows:

$$F_{dashboard} = F_s(p) + F_c(q) \qquad \text{(formula 7)}$$

where, $F_s(p)$ is the total average load time of simple components/formulas according to formula 5, and $F_c(q)$ is the total average load time of complex components/range formulas according to formula 6.

With $F_s$ and $F_c$ determined, the total standard deviation of simple components and simple formulas $D_s$ and total standard deviation of the complex components and range formulas $D_c$ can be calculated. In one embodiment $D_s$ is calculated as follows:

$$D_s(p) = \sqrt{\Sigma_{i=1}^{p}(\sigma_i^2 * N_i)} \qquad \text{(formula 8)}$$

where, p is the quantity of types of simple components and simple formulas, i is a natural number from 1 to p, $\sigma_i$ is the standard deviation of the mean or average time of the $i^{th}$ type of component/formula from the tables according to formula 2, and $N_i$ is the quantity of the $i^{th}$ type of component/formula.

As for Dc, it can be calculated as follows:

$$D_c(q) = \sqrt{\Sigma_{i=1}^{q} cplx\sigma_i^2(m_i)} \qquad \text{(Formula 9)}$$

where, q is the quantity of complex components and formulas, i is a natural number from 1 to q, $m_i$ the quantity of data points binding to the $i^{th}$ complex component/range formula, and $cplx\sigma_i$ is the $i^{th}$ standard deviation of the mean or average time of the $i^{th}$ complex component/range formula according to formula 4.

Once the $D_s$ and $D_c$ are calculated, the standard deviation of the dashboard $D_{dashboard}$ can be determined as follows:

$$D_{dashboard} = \sqrt{D_s^2(p) + D_c^2(q)} \qquad \text{(formula 10)}$$

where, $D_s(p)$ is the standard deviation of simple components and simple formulas of the dashboard according to formula 8, and $D_c(q)$ is the standard deviation of complex components and range formulas of the dashboard according to formula 9.

Once $F_{dashboard}$ and $D_{dashboard}$ are determined, the average load time or performance of the dashboard under analysis is in the range of $F_{dashboard} \pm D_{dashboard}$.

The performance analysis, as described, determines the average load times of the various elements of the dashboard. The average load times of the various dashboard elements may be contained in the performance evaluator. Storing the load times at other locations, such as a knowledge base, may also be useful. An element contributes to the overall average load time of the dashboard. For example, an element's average load time may be considered as a performance cost to the overall performance of the dashboard. Various reasons may increase the average load time or performance cost of an item.

In one embodiment, the recommender may provide suggestions to improve performance based on the performance cost. For example, the recommender may provide suggestions related to high performance cost items. High performance cost items may be items having a long load time. High performance cost items may include groups of items as well. For example, a high performance cost item may be a group of items which exceed a threshold number of items and the load time threshold. For complex components and range formulas, they may be considered high performance cost items if they exceed a threshold number of data points and the load time threshold. Other categories or techniques for determining high performance cost items may also be useful.

Table 4 below shows an exemplary embodiment of a costs-suggestions table with some reasons of high performance costs and pre-defined suggestions for improving performance.

TABLE 4

| Performance Costs | Suggestions |
| --- | --- |
| Component bind too much data points | Reduce the binding range |
| Dashboard includes too many components | Reduce the amount of the components, separate them into several sub dashboards |
| Dashboard uses too many formulas | Reduce the amount of the formulas |
| Dashboards uses too many complex formulas | Use simple formulas<br>Use add-on to replace the complex formula<br>Move data aggregation to data source |
| Each formula reference large range | Reduce the data range and remove unused data points |

Other high performance cost reasons and suggestions may also be included. The costs-suggestions table, for example, may be stored in the knowledge base.

The performance costs of a dashboard may be displayed to the user. The user may select a dashboard item based on its performance cost. When an item is selected, the user is redirected to, for example, a component's property sheet or the formula editor, depending on the item. The user may modify the item based on the suggestions of the recommender.

The rating engine provides a performance rating of the dashboard based on its average load time. The rating may be based on a rating of 0-X, with X being the best and 0 being the worst. The rating range may have any granularity. Preferably, the granularity is about 10 or 11. Providing a rating range having other granularities may also be useful. In one embodiment, the rating range is based on a star system, such as from 1-5 stars, having a granularity of half stars. This, for example, results in a rating range of 0-11. For example, a 5 star rating indicates that the dashboard has the highest rating or best performance while a 0 star rating indicates that the dashboard has the lowest rating. A look up table may be provided to dictate the rating of the dashboard under analysis based on its average load time. The rating look up table may be contained in, for example, the rating engine. Table 5 below shows an exemplary look up table or rating schedule of the rating engine:

TABLE 5

| Performance Data (S) | Star Rates |
| --- | --- |
| (0, 1] | ★★★★★ |
| (1, 1.5] | ★★★★⯪ |
| (1.5, 2] | ★★★★☆ |
| ... | ... |
| (30, 60] | ★☆☆☆☆ |
| (60, +∞] | ☆☆☆☆☆ |

The symbol "(" indicates that adjacent number to it is inclusive while the symbol "]" indicates that the adjacent number is excluded. As shown, the granularity is half a star. The performance rating from best to the least is based on average load time of less than 1 second and greater than or equal to 60 seconds. For example, an average load time of a dashboard with 0.99 second with a standard deviation of 0.05 second would be assigned a 5 star or the best rating. Preferably, the higher (better) ratings will be more closely grouped based on load times while the lower ratings are more widely grouped. Other configurations of the ratings may also be useful.

Figure 6:
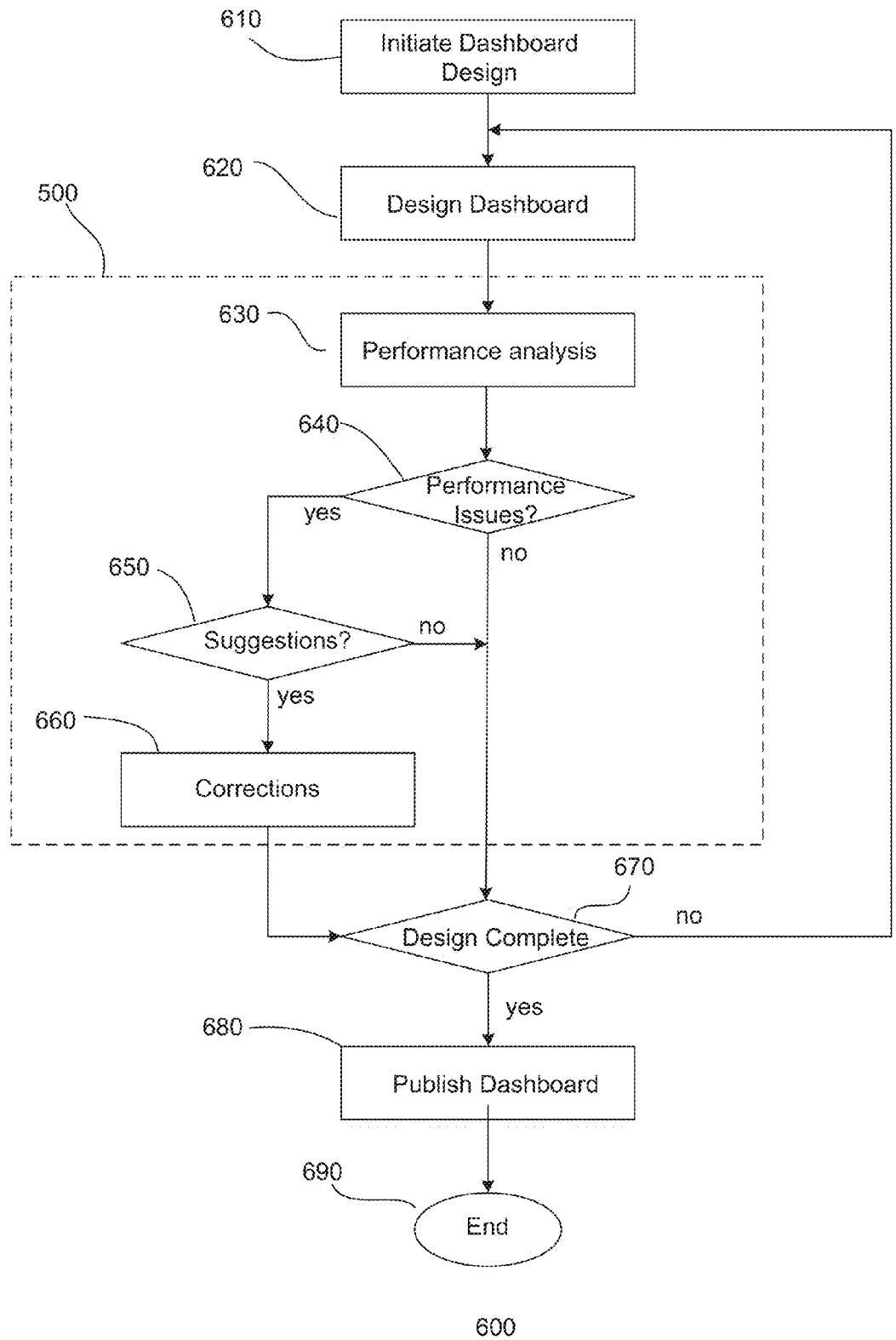
FIG. 6 illustrates an embodiment of a process for designing a dashboard, including performing a performance analysis.

FIG. 6 illustrates an embodiment of a process 600 for designing a dashboard. In one embodiment, the designing process includes a performance analysis. At step 610, a user may initiate the process for designing a dashboard. For example, a dashboard design application or dashboard designer is initiated to facilitate designing a dashboard. In one embodiment, the dashboard designer includes a PAS. For example, the PAS is integrated as part of the dashboard designer. Initiating the dashboard designer also initiates the PAS.

The user may select various performance evaluation parameters or settings. The performance evaluation parameters, in one embodiment, include device type and performance costs. In some cases, the PAS has default parameters. For example, if the user does not select any parameters, the PAS reverts to default settings for the evaluation.

The device type parameter sets the PAS to the device which the performance analysis is based. For example, the user selects the type of device which the dashboard will be run on. As for the performance cost option, the user may select the performance costs to display. For example, the user may select the top N performance costs to display. The items may be displayed regardless of whether they pose a performance issue or not. In some embodiments, performance costs which are displayed are those which have performance issues, such as those which exceed a performance load time and/or other thresholds. For example, items which do not exceed a load time threshold may not be displayed since they are not considered to be performance issues.

At step 620, the user commences designing a dashboard. For example, the user, utilizing the canvas of the dashboard designer, inserts a dashboard item into the dashboard under design. A dashboard model of the dashboard, at step 630, is evaluated for its performance. For example, the PAS analyzes the dashboard model. The dashboard model is analyzed according to the evaluation settings.

In one embodiment, the performance evaluation includes parsing the dashboard design to identify the items of the dashboard. For example, the dashboard parser identifies dashboard items and the associated variables, including item name, item category, variable type and variable value, such as that described in Table 2. The average load times and standard deviations of the dashboard items are determined. In one embodiment, the average load times and standard deviations of the dashboard items are determined from performance benchmark data. Based on the average load times and standard deviations of the dashboard items, the average load time and standard deviation of the dashboard is determined. The average load times and standard deviations of dashboard items and dashboard may be determined, as described in FIG. 5.

At step 640, the process determines if there are performance issues or deficiencies. For example, the PAS provides a rating of the dashboard. Based on the rating, the user may determine if there are performance issues. For example, if the rating engine provides a rating of less than 4 stars, there may be performance issues. For example, a rating of less than 4 stars indicates that the load time of the dashboard is more than 2 seconds. Determining whether there is a performance issue based on other types of ratings may also be useful.

If there are no performance issues, the process may proceed to step 670. For example, the performance rating of the dashboard is 4 stars or more. If there is a performance issue, the process proceeds to step 650. For example, the user determines if there is a performance issue based on the performance rating. At step 650, the process determines whether or not there is a solution for the performance issue or issues. For example, the PAS displays performance costs associated with dashboard items. The performance costs displayed may be selected by the user. The performance costs may include suggestions to improve performance, as provided by, for example, a costs-suggestions table. If there are no suggestions provided, the process may continue to step 670.

On the other hand, if there are suggestions provided by the PAS, the user may follow the suggestions by making appropriate corrections at step 660. After corrections are made to the dashboard, in one embodiment, the PAS analyzes the changes and provides updated ratings and costs list. For example, the process returns to step 630 and repeats the analysis process. If no performance issues exist, the process continues to step 670.

Even if there are suggestions, the user may decide not to follow the suggestions and proceed to step 670 instead. By the same token, a user may make changes to the dashboard even when there are no performance issues. For example, a user may make changes to see how those changes affect the performance of the dashboard. In such cases, the process may return to step 630 until the user decides to proceed to step 670.

At step 670, if the design is not complete, the process returns to step 620 to continue designing the dashboard. For example, the user may insert another item into the dashboard. If the dashboard is complete, the dashboard is published at step 680 and the process terminates at step 690. As described, process steps 630-660 may be performed by or within the PAS.

As described, the designing and analyzing of the dashboard by PAS is performed at about the same time. For example, the analyzing may be performed in real time or about real time as the dashboard is being designed. As the user inserts an item into the dashboard or makes a change to the dashboard, PAS automatically analyzes the dashboard. For example, performance rating of the dashboard, average load time of the dashboard and average load times of dashboard items are provided as the dashboard is being designed. In other embodiments, the PAS may be initiated after the dashboard design is completed. For example, the user may initiate the PAS separately from the dashboard designer. Upon initiating PAS, the user may select the PAS parameters. Additionally, the user may provide the dashboard to be analyzed. Other implementations of the design and analysis process may also be useful.

Figure 7:
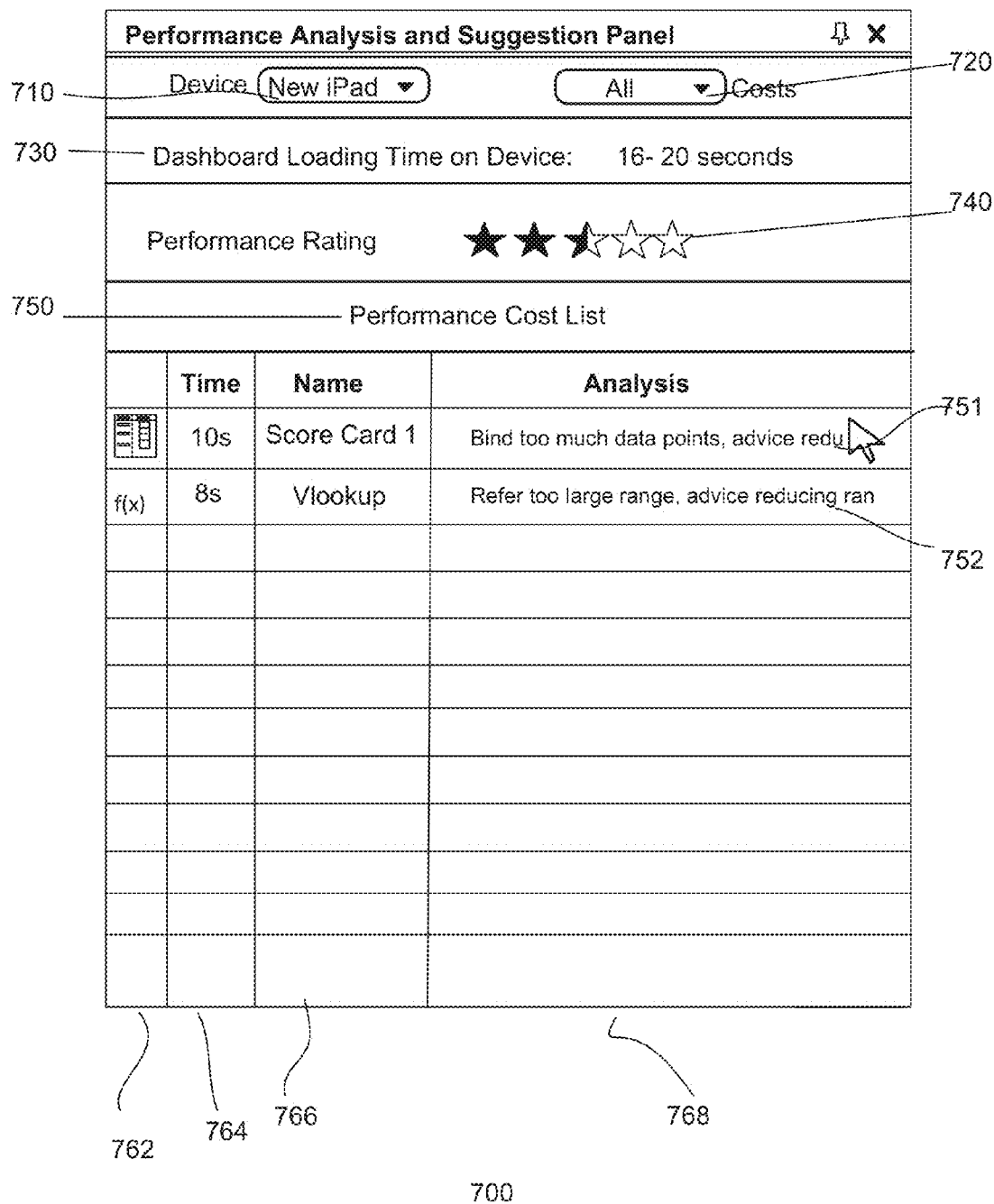
FIG. 7 shows an embodiment of a PAS panel.

FIG. 7 shows an embodiment of a PAS panel 700. The PAS panel includes one or more setting boxes for selecting or defining parameters of the analysis. The PAS panel, in one embodiment, includes a device setting box 710. The device setting box, for example, includes a drop down menu listing different devices available for performance evaluation. For example, a user may select the device on which the dashboard is intended to run or based. As shown, the performance evaluation is based on an iPad.

The PAS panel also includes a performance cost setting box 720. The performance cost setting box provides a user the option to select performance costs to display in a performance cost list display 750. A dashboard item is a performance cost to the overall performance of the dashboard. In one embodiment, the user may select top N performance costs to display. For example, the user may select all costs or top N number of performance costs of the dashboard. The options of N may be in the range from 5 to 50, where the granularity for the lower numbers may be 5 and escalate to 10 and 20 for higher numbers. For example, a user may have the option to select all, top 5, 10, 20, 30, or 50 (e.g., N=5, 10, 2-, 30 and 50) performance costs of the dashboard. In some embodiments, the performance cost selection box may provide a user the option to enter a number. For example, in addition to selection options, a user may be provided with the option to enter a specific number. Depending on the number of dashboard items, selecting a high number may in effect select all items. For example, if the number option selected is greater than the number of dashboard items, all items would be displayed.

Illustratively, the performance cost selection box indicates that the user selected all performance costs to be listed in the performance cost list. The performance cost list, as shown, is a table which includes first, second, third and fourth columns 762, 764, 766 and 768. The first column indicates the item. For example, the first column indicates the item by its icon. The item, for example, may be a simple formula, range formula, simple component or complex component. The second column shows the average load time of the dashboard element, the third column is the name of the dashboard element, and the fourth column provides comments based on the performance analysis.

The exemplary dashboard analyzed includes first and second dashboard items or elements 751 and 752, filling first and second rows of the performance cost list. The first element is a complex component with the name Score Card 1 having an average load time of 10 seconds; the second element is a range formula with the name Vlookup having a load time of 8 seconds. The analysis indicates that the long load time of the first element (complex component) is due to binding of too many data points. The suggestion (advice) by PAS to improve performance is to reduce the amount of data points being bound to the first dashboard element. As for the second dashboard element, the analysis indicates that the range formula refers to too large a data range. The suggestion (advice) by PAS to improve performance is to reduce the data range.

A dashboard average load time display panel 730 is provided to indicate the average load time of the dashboard. As shown, the average load time of the dashboard with Score Card 1 and Vlookup is between 16-20 seconds. In other words, the average load time of the dashboard is 18 seconds±2 seconds. A rating panel 740 is provided. The rating panel indicates the rating of the dashboard based on its average load time or average load time range. As shown, with a 16-20 second average load time, the rating is 2.5 stars. Providing other configurations of a PAS panel may also be useful.

Figure 8A:
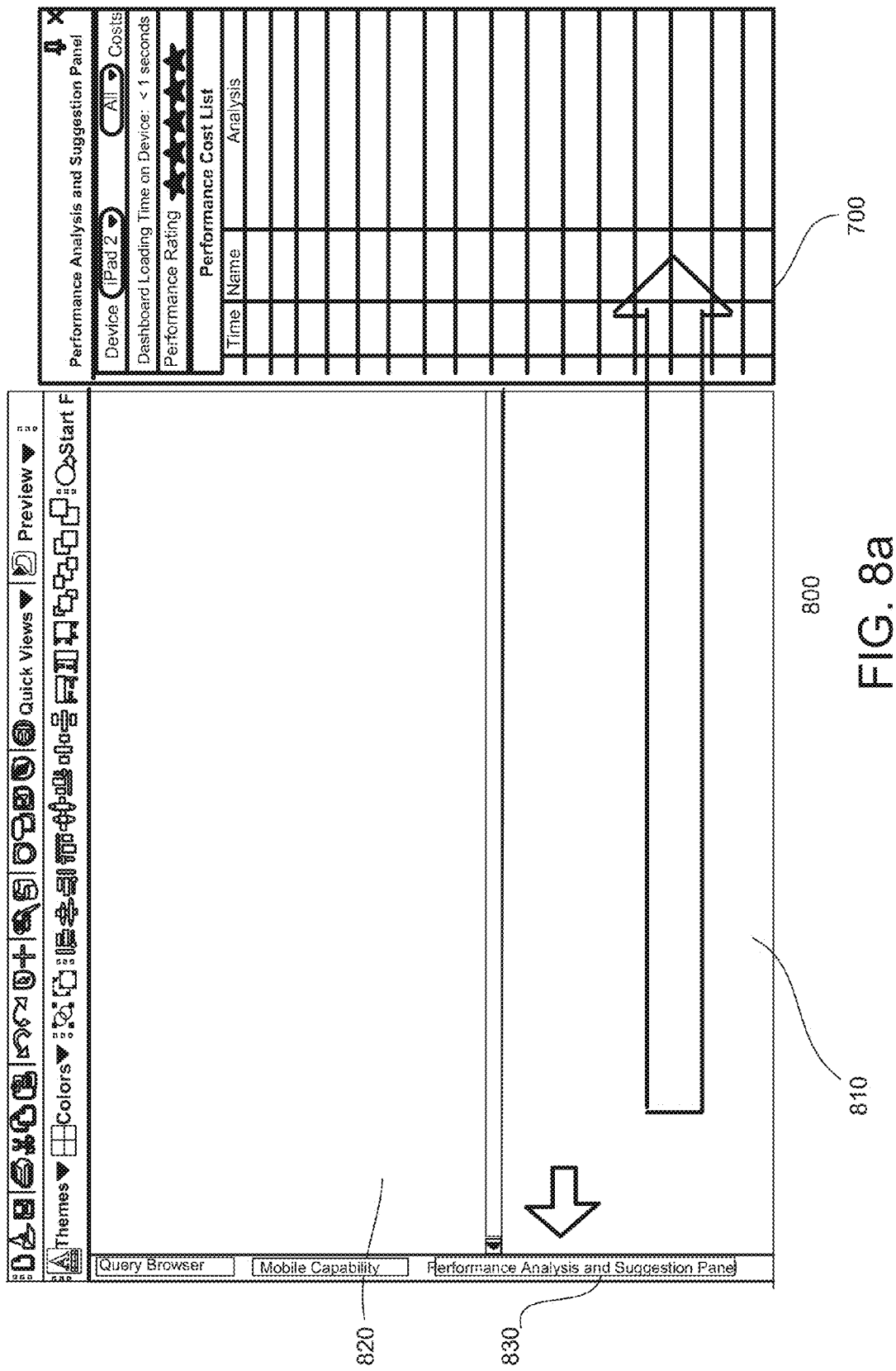
FIGS. 8a-f show exemplary screen-shots of an embodiment of a process flow for a PAS.

FIGS. 8*a-f* shows exemplary screen-shots or mock ups of an embodiment of a process flow 800 for a PAS. Referring to FIG. 8*a*, an embodiment of a dashboard design desktop 810 of a dashboard design application or dashboard designer is shown. The dashboard designer, for example, may be SAP BusinessObjects Dashboards from SAP. Other types of dashboard designers may also be useful. The dashboard desktop includes a dashboard design panel 820. A user may use the design panel to design a dashboard. The design panel, for example, may include menu bars and commands to facilitate designing a dashboard.

In one embodiment, a PAS is integrated into the dashboard designer. For example, the PAS is initiated when the dashboard designer is initiated to design a dashboard. As shown, a PAS tab 830 is provided. The PAS tab may be disposed on a side of the design panel. Providing the PAS tab at other locations may also be useful. The PAS tab is used to open a PAS panel 700. For example, clicking on the PAS tab causes the PAS panel to be displayed. Illustratively, the PAS panel is displayed adjacent to the dashboard desktop. The PAS panel, for example, is similar to the PAS panel described in FIG. 7. Displaying other types of PAS panels or at other locations on the desktop may also be useful.

Figure 8B:
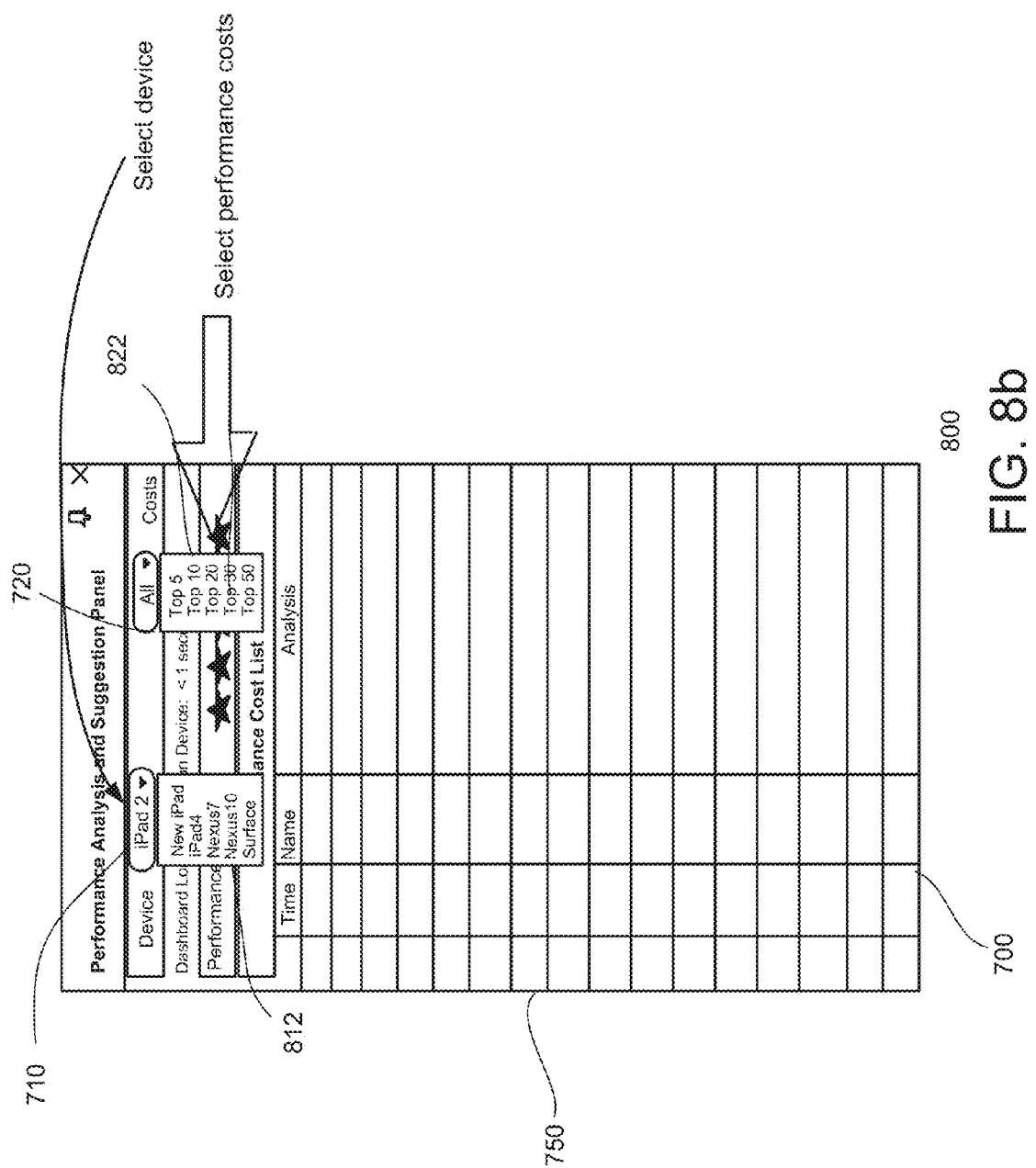

In FIG. 8*b*, the user selects appropriate settings in the device and performance costs setting boxes 710 and 720 of the PAS panel. Clicking on a setting box displays a list of items available for selection. The user selects the desired option available from the setting boxes. For example, the device setting box displays a device list 812. The device list relates to available devices on which the performance analysis is performed. Illustratively, the list includes New iPad, iPad4, Nexus 7, Nexus 10, and Surface devices as available devices. Other types of device lists may also be useful. For example, the device list may include other devices, including processor and operating system types. As for the performance costs setting box, a cost list 822 of available top N performance costs, including all, is displayed. Other types of cost lists may also be useful. For example, the cost list may include other top N costs and an option for the user to input the desired number.

Figure 8C:
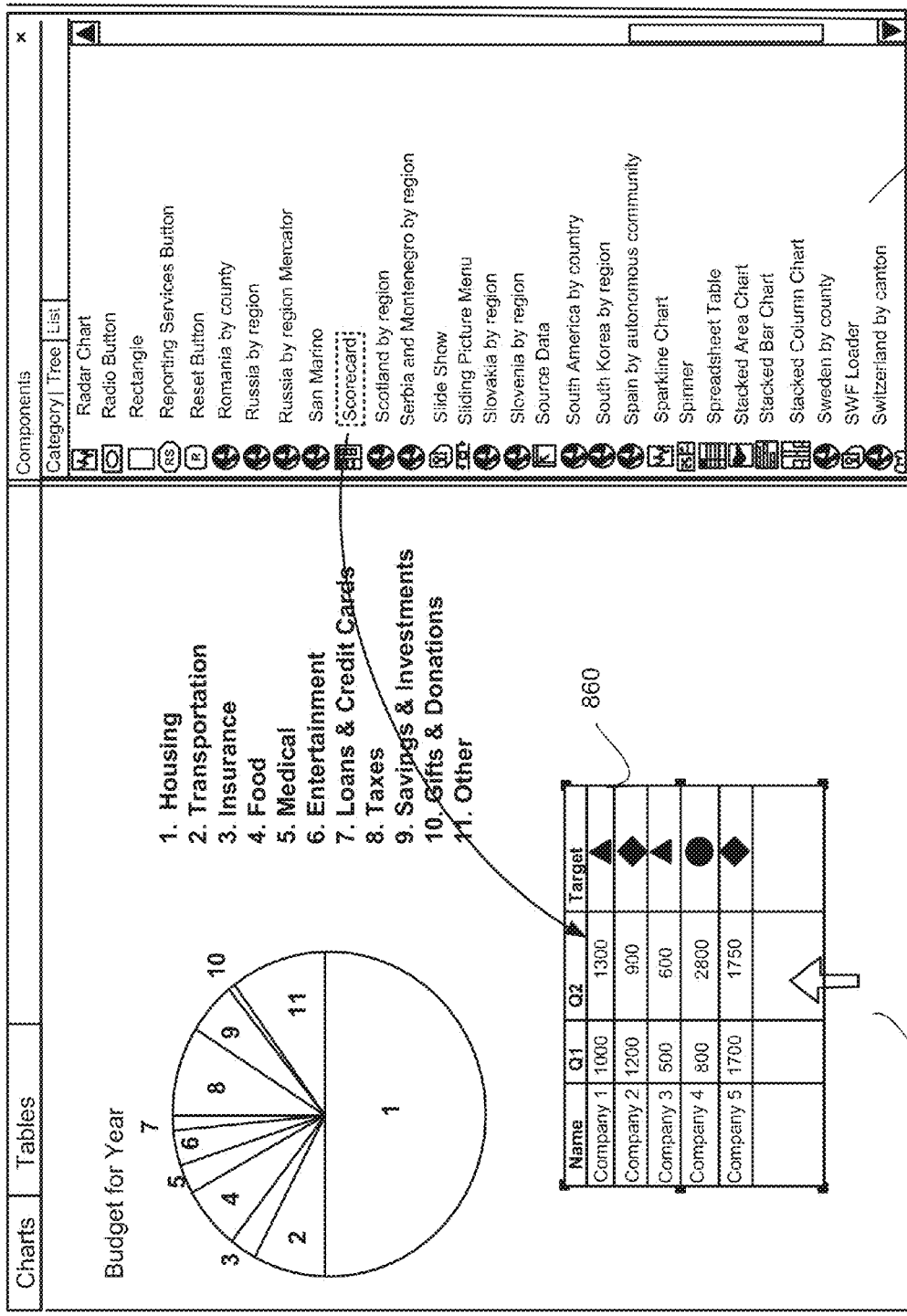
Figure 8D:
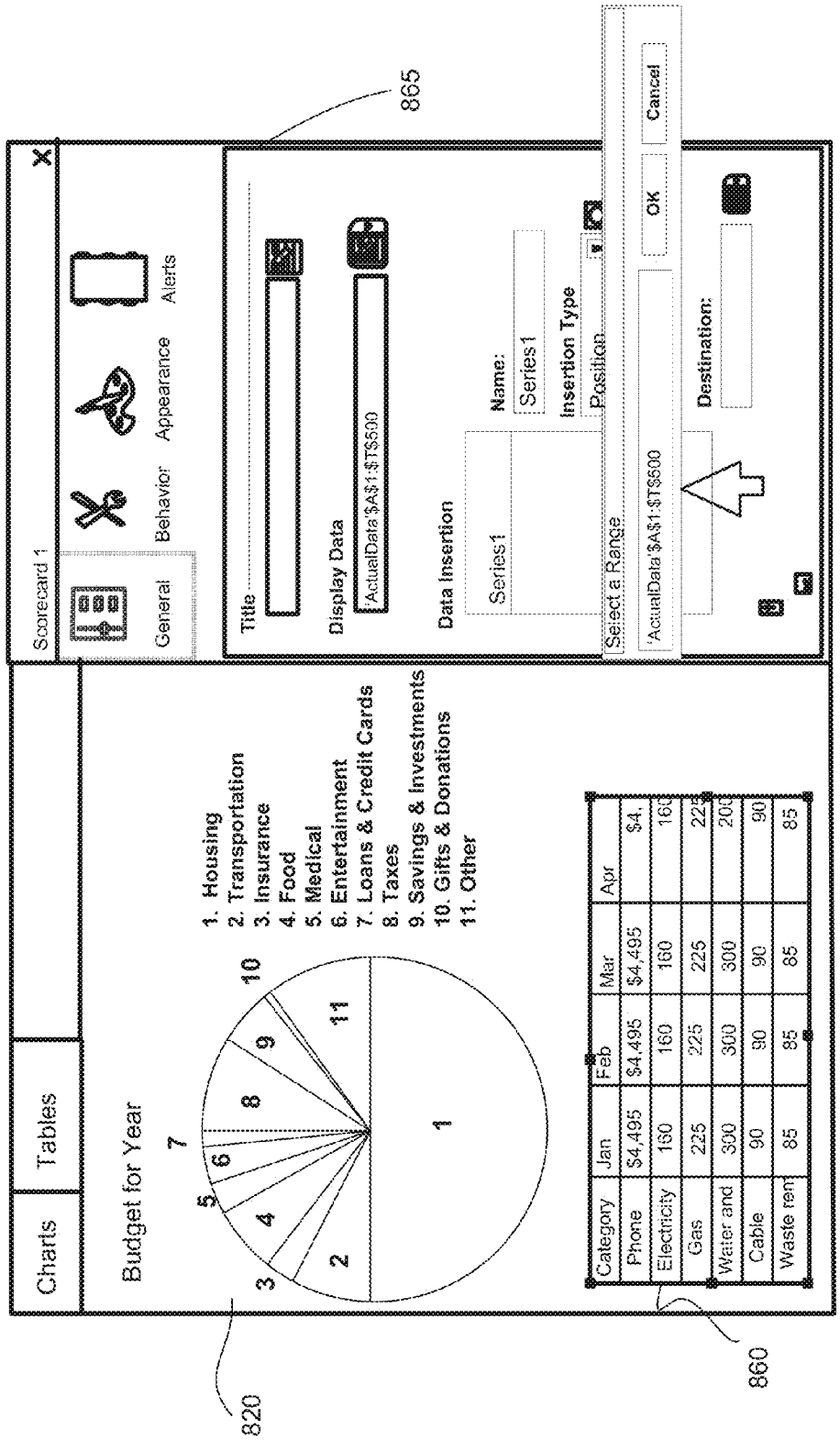

In FIG. 8*c*, a user designs a dashboard using the dashboard designer. For example, the user inserts an item 860 into the dashboard design panel. As shown, the user, using a components list 850, selects the scorecard icon to insert a scorecard into the dashboard design panel. The dashboard, as shown, also includes a pie chart and a range formula. The user, in FIG. 8*d*, binds data to scorecard 850. For example, in a property page 865 of the scorecard, the user selects a range for binding data points to the scorecard. Illustratively, the user binds 10,000 data points.

Figure 8E:
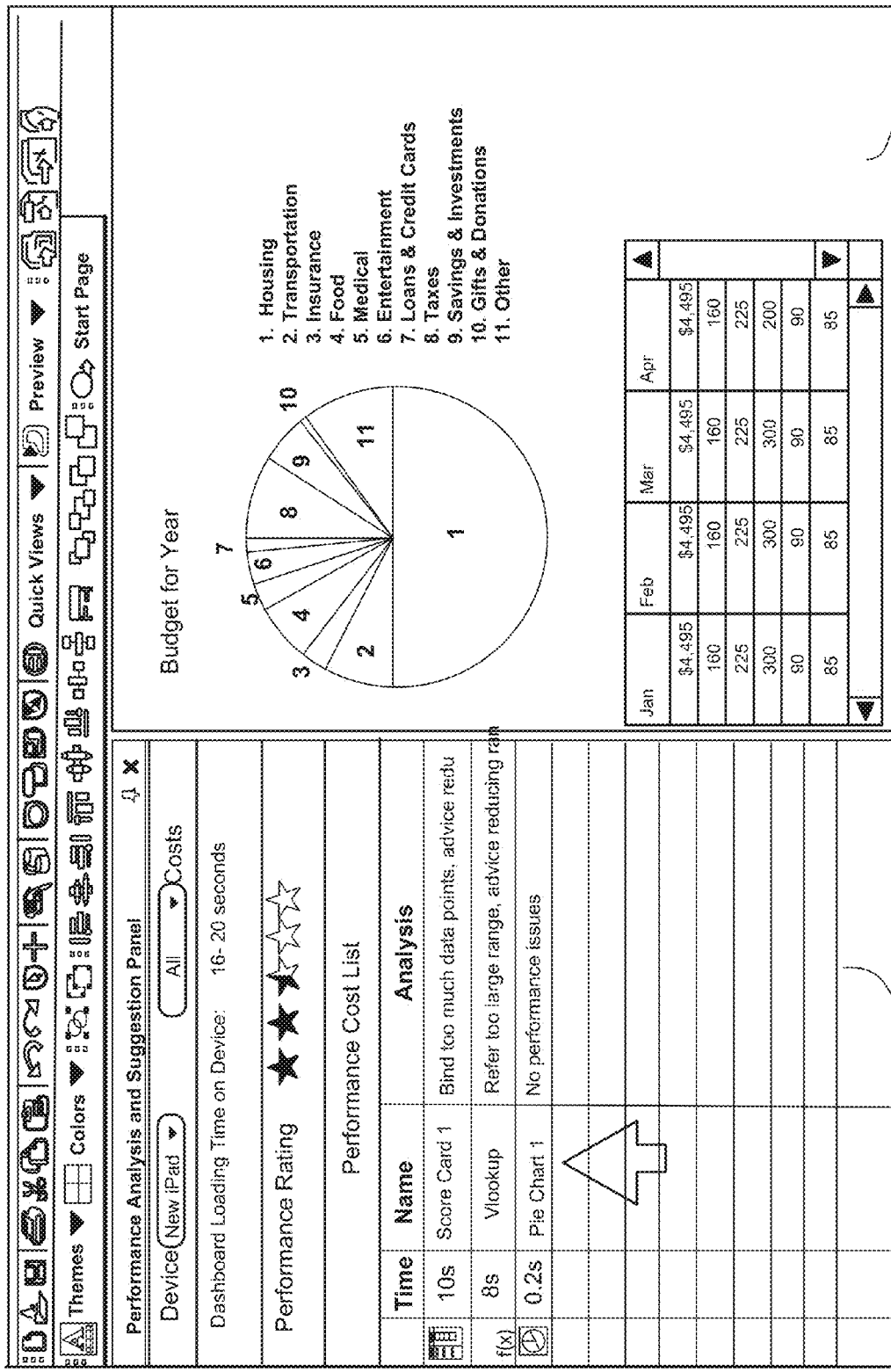

Referring to FIG. 8*e*, the PAS panel 700 displays the results of the performance analysis of the dashboard after binding data to the scorecard. The dashboard panel displays the dashboard load time, performance rating and performance costs of the dashboard items in the performance cost list. As shown, the dashboard items scorecard and Vlookup have average load times of 10 seconds and 8 seconds, respectively while Pie Chart 1 has a load time of 0.2 seconds. The PAS provides reason and suggestion as to the high average load times in the performance cost list. For Pie Chart, which is a load time, it is indicated to have no performance issues. The average load time of the device is 16-20 seconds with a performance rating of 2.5 stars. This indicates that the dashboard has performance issues.

Figure 8F:
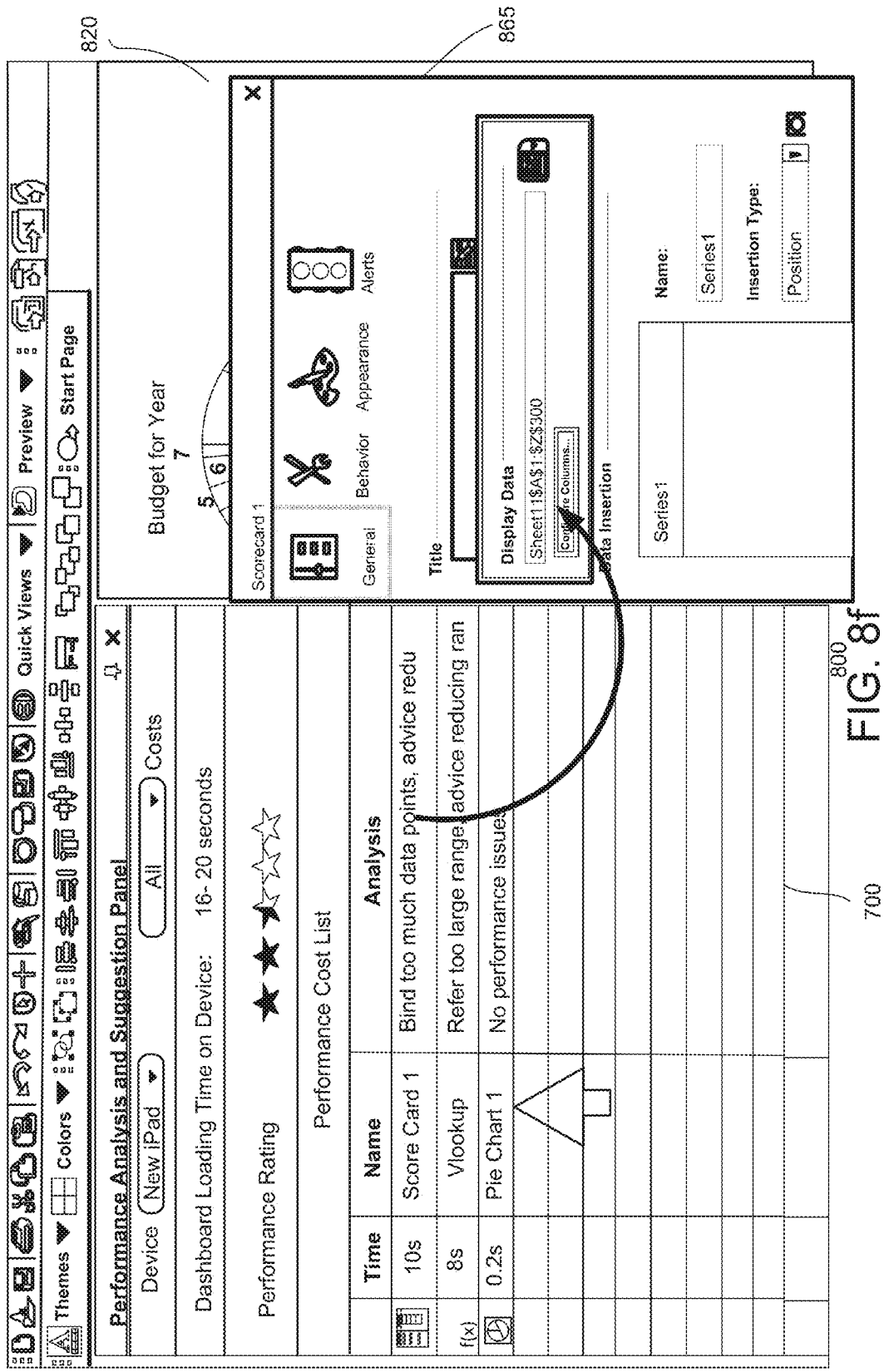

In FIG. 8*f*, the user may select an item in the performance cost list. For example, the user may select scorecard by double clicking on it. Selecting scorecard causes the PAS to redirect the user to the property page of scorecard. The user may modify scorecard based on suggestion by PAS to improve its performance. The process may repeat until the user is satisfied with the performance rating of the dashboard. In addition, the process, as illustrated in FIGS. 8*c-f* may be repeated for additional dashboard items until designing of the dashboard has been completed. The PAS may provide real time performance data and optimization suggestions while a user is designing a dashboard. Additionally, the PAS can offer detail performance data report for existing dashboards, and indicate their performance ranking for different devices.

The PAS may be embodied as an application. For example, the PAS may be embodied as a software application. The application may be integrated into an existing software application, such as a dashboard design application, as an add-on or plug-in to an existing application, or as a separate application. The existing software application may be a suite of software applications. The source code of the evaluator system may be compiled to create an executable code. The codes of the evaluator, for example, may be stored in a storage medium, such as one or more storage disks. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of evaluating a dashboard design comprising:
providing a dashboard with one or more dashboard items;
evaluating performance of the dashboard to determine a load time of the dashboard; and
providing possible suggestions for improving performance of the dashboard if performance issues are determined from evaluating performance of the dashboard.

2. The method of claim 1 wherein evaluating performance comprises determining an average load time of the dashboard.

3. The method of claim 1 wherein evaluating performance comprises determining an average load time of the dashboard based on a device.

4. The method of claim 3 wherein determining the average load time comprises:
determining average load times of dashboard items; and
summing the average load times of the dashboard items to determine the average load time of the dashboard.

5. The method of claim 4 further comprising parsing the dashboard to determine the dashboard items of the dashboard.

6. The method of claim 5 wherein determining the average load times of the dashboard items comprises:
providing performance benchmark data containing average load times of different dashboard items; and
obtaining the average load times of the dashboard items of the dashboard from the performance benchmark data.

7. The method of claim 6 wherein the performance benchmark data contains the average load times of the different dashboard items based on different devices.

8. The method of claim 7 wherein the performance benchmark data is obtained by actual testing using the different devices.

9. The method of claim 1 wherein evaluating performance of the dashboard comprises providing a performance rating based on an average load time of the dashboard.

10. The method of claim 9 wherein:
the average load time of the dashboard is based on a sum of average load times of the dashboard items of the dashboard; and
displaying the average load times of the dashboard items to indicate performance cost of the dashboard items.

11. The method of claim 10 further comprising providing suggestions to improve performance based on the average load times of the dashboard items.

12. The method of claim 10 further comprising providing suggestions to improve performance based on the average load times of the dashboard items if they exceed a threshold load time.

13. A dashboard evaluation system comprising:
a dashboard parser, the dashboard parser identifies items of the dashboard;
a performance evaluator, the performance evaluator determines a load time of the dashboard; and a recommender, the recommender suggests solutions to improve performance of the dashboard.

14. The system of claim 13 wherein the performance evaluator generates a performance rating based on the load time of the dashboard.

15. The system of claim 13 wherein the dashboard parser generates an output containing the dashboard items of the dashboard.

16. The system of claim 15 wherein the load time of the dashboard comprises an average load time of the dashboard.

17. The system of claim 15 wherein the load time of the dashboard comprises an average load time of the dashboard based on a device.

18. A non-transitory computer-readable storage medium having a computer readable program code tangibly embodied therein, the computer readable program code adapted to be executed by a processor to implement a method for evaluating a dashboard design comprising:
   providing a dashboard;
   evaluating performance of the dashboard to determine a load time of the dashboard; and
   providing possible suggestions for improving performance of the dashboard if performance issues are determined from evaluating performance of the dashboard.

19. The non-transitory computer-readable storage medium of claim 18 wherein the computer readable program code is integrated with a dashboard designer.

20. The non-transitory computer-readable storage medium of claim 18 wherein evaluating performance comprises determining an average load time of the dashboard.

* * * * *